(12) United States Patent
Wolters

(10) Patent No.: US 12,285,791 B2
(45) Date of Patent: Apr. 29, 2025

(54) TORQUE SUPPORT FOR ABSORBING DRIVE TORQUES AND ROLLER ARRANGEMENT WITH A TORQUE SUPPORT

(71) Applicant: MATTHEWS INTERNATIONAL CORPORATION, Pittsburgh, PA (US)

(72) Inventor: René Wolters, Stadtlohn (DE)

(73) Assignee: Matthews International Corporation, Pittsburgh, PA (US)

( * ) Notice: Subject to any disclaimer, the term of this patent is extended or adjusted under 35 U.S.C. 154(b) by 277 days.

(21) Appl. No.: 17/799,439

(22) PCT Filed: Jan. 5, 2021

(86) PCT No.: PCT/DE2021/100000
§ 371 (c)(1),
(2) Date: Aug. 12, 2022

(87) PCT Pub. No.: WO2021/160200
PCT Pub. Date: Aug. 19, 2021

(65) Prior Publication Data
US 2023/0338960 A1    Oct. 26, 2023

(30) Foreign Application Priority Data
Feb. 13, 2020    (DE) .................. 10 2020 103 823.2

(51) Int. Cl.
*B02C 4/00*    (2006.01)
*B02C 4/42*    (2006.01)
(Continued)

(52) U.S. Cl.
CPC .............. *B21B 31/02* (2013.01); *B02C 4/426* (2013.01); *D21G 1/0006* (2013.01)

(58) Field of Classification Search
CPC ......... B02C 4/426; B21B 31/02; B21B 35/04; D21G 1/0006
See application file for complete search history.

(56) References Cited

U.S. PATENT DOCUMENTS 4,559,990 A * 12/1985 Greilinger ............... B21B 35/04
                                                     164/428
4,880,172 A * 11/1989 Heinemann ............. B02C 4/426
                                                     241/231
(Continued)

FOREIGN PATENT DOCUMENTS

| CN | 101340978 | 1/2009 |
| CN | 106470761 | 3/2017 |

(Continued)

OTHER PUBLICATIONS

CNIPA, Appl. 202180020740.X, Office Action, Mar. 27, 2024.
(Continued)

*Primary Examiner* — Faye Francis
(74) *Attorney, Agent, or Firm* — Jones Day

(57) ABSTRACT

A torque support for absorbing drive torques of at least one shaft drive, having two first force-conducting elements, each of which is rotatably fixed to the shaft drive at a distance from one another by a first end, and having a support element arranged at a distance from the shaft drive, to which support element the first force-conducting elements are each fixed rotatably and at a distance from one another by a second end opposite the first end, and spaced apart from one another, and having two second force-conducting elements which are each fixed at a first end to the support element in a rotatable manner and spaced apart from one another and are each fixed at a second end, opposite the first in each case, to a fixed element which is independent of the shaft drive in (Continued)

Figure 1:
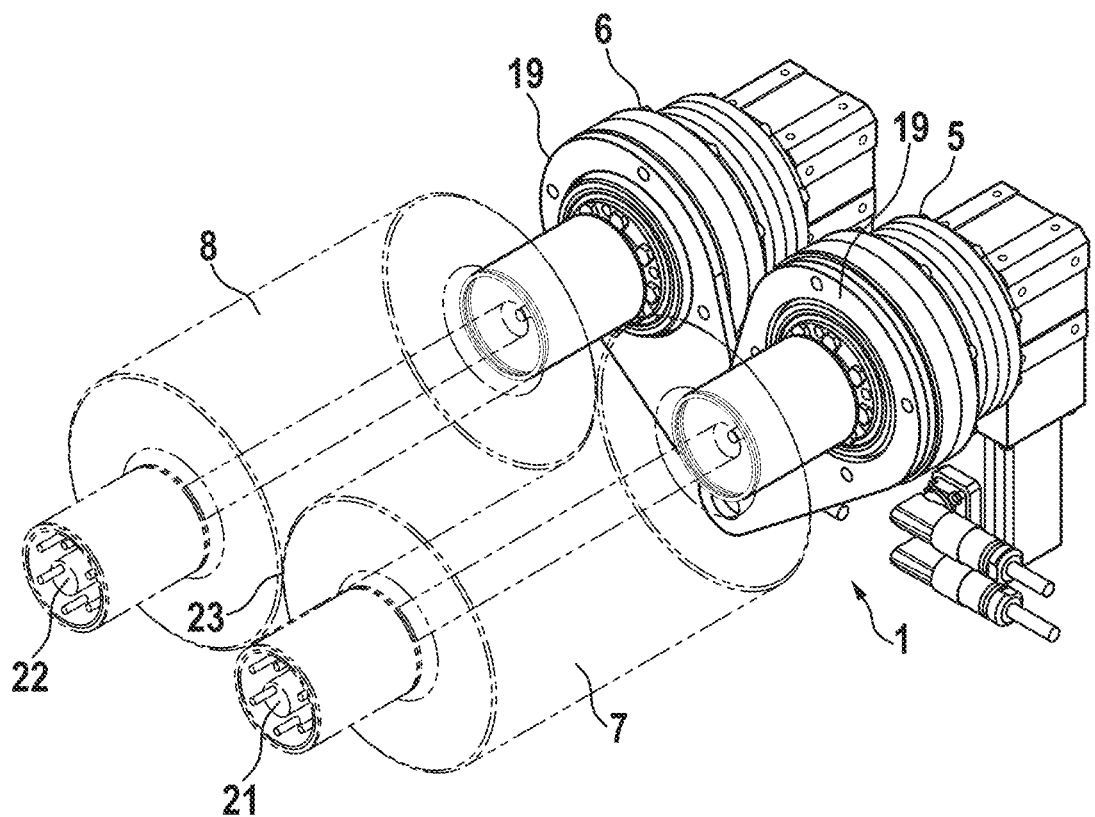

a rotatable manner and spaced apart from one another. A corresponding roller arrangement is further disclosed.

14 Claims, 9 Drawing Sheets

(51) Int. Cl.
    *B21B 31/02*    (2006.01)
    *D21G 1/00*    (2006.01)

(56) References Cited

U.S. PATENT DOCUMENTS

| | | | | |
|---|---|---|---|---|
| 5,003,835 A * | 4/1991 | Ackermann | ............ | F16F 15/06 266/247 |
| 5,005,775 A | 4/1991 | Jakobs | | |
| 5,192,030 A * | 3/1993 | Jakobs | .................... | B02C 4/426 241/234 |
| 5,542,618 A * | 8/1996 | Andersen | ................ | B02C 4/426 241/234 |
| 5,553,796 A | 9/1996 | Bettenworth | | |
| 6,247,383 B1 * | 6/2001 | Chun | ....................... | F16H 35/06 74/606 R |
| 2019/0277390 A1 * | 9/2019 | Düvel | .................... | B02C 4/426 |

FOREIGN PATENT DOCUMENTS

| | | | |
|---|---|---|---|
| CN | 110242739 | 9/2019 | |
| DE | 8712742 U1 | 11/1987 | |
| DE | 3723605 | 1/1989 | |
| DE | 3901060 A1 | 7/1990 | |
| DE | 4019363 C1 | 8/1991 | |
| DE | 19521205 | 12/1996 | |
| DE | 19619110 A1 | 11/1997 | |
| DE | 102008058304 A1 | 5/2010 | |
| DE | 102014016973 A1 * | 5/2016 | ............ B21B 35/04 |
| DE | 102015013670 | 5/2016 | |
| EP | 0775525 B1 * | 12/2001 | ............ B02C 4/426 |
| FR | 2641713 A1 | 7/1990 | |
| JP | H02-233152 | 9/1990 | |

OTHER PUBLICATIONS

Japan Patent Office, Appl. 2022-549110, Reasons for Refusal, Oct. 31, 2023.

International Search Report (English and German) and Written Opinion of the ISA (German) issued in PCT/DE2021/100000, mailed Apr. 13, 2021; ISA/EP.

German International Preliminary Report on Patentability issued in PCT/DE2021/100000, mailed May 9, 2022.

* cited by examiner

TORQUE SUPPORT FOR ABSORBING DRIVE TORQUES AND ROLLER ARRANGEMENT WITH A TORQUE SUPPORT

CROSS-REFERENCE TO RELATED APPLICATIONS

This application is a U.S. National Phase Application under 35 U.S.C. 371 of International Application No. PCT/DE2021/100000, filed on Jan. 5, 2021, which claims the benefit of German Patent Application No. 10 2020 103 823.2, filed on Feb. 13, 2020. The entire disclosures of the above applications are incorporated herein by reference.

BACKGROUND

This section provides background information related to the present disclosure which is not necessarily prior art.

TECHNICAL FIELD

The invention relates to a torque support for absorbing drive torques of at least one shaft drive, having two first force-conducting elements, which are each rotatably fixed to the shaft drive at a distance from one another by a first end, and having a support element which is arranged at a distance from the shaft drive and to which the first force-conducting elements are each rotatably fixed at a second end opposite the first end and at a distance from one another, and spaced apart from one another, and with two second force-conducting elements, which are each rotatably fixed to the support element at a first end and spaced apart from one another and are each rotatably fixed to a fixed element independent of the shaft drive at a second end opposite the first end and spaced apart from one another.

DISCUSSION

In prior art calender or rolling mill drives, the drive torques are absorbed by simple torque supports, in which the drives are directly connected to the roll and the absorption of the torques often takes place via the connection to the machine frame, external frames or by a mutual interception of two rigid one-piece torque supports. A torque support is known, for example, from utility model DE 87 12 742 U1.

This type of torque support with a one-sided interception of the torque introduces a force into the bearing arrangement. When torques occur, they are intercepted by the torque support by the torque support acting as a lever arm, at the end of which a force counteracts. However, this creates a retroactive force on the drive, whereby this force ensures that the roll is forced out of its position and, depending on the intercepted drive torque, can have varying degrees of influence on the accuracy of the system. Since the retroactive force has a force component in the same direction of action as the actual calender, it has a direct influence on the rolling force or the nip.

Another problem that exists, for example, with torque supports that are connected to each other is that when the rolls are moved linearly in the horizontal direction, i.e. when the nip is varied, the angular position of the rolls in relation to each other changes. Furthermore, if the torque support is externally connected, there is the problem that if the bearing point of the torque support is externally fixed, the roll bearing can only move freely to a limited extent.

If the torque is absorbed via two external points positioned on opposite sides of the drive, this does not result in any retroactive force on the bearing or the drive, respectively. However, the problem with this design of torque support is that the drive is fixed in its position both rotationally and linearly by the use of two coupling points and thus cannot completely compensate for movements acting on it or cannot be moved relative to another roller.

SUMMARY

This section provides a general summary of the disclosure, and is not a comprehensive disclosure of its full scope or all of its features.

It is therefore one aspect of the present invention to improve a torque support in such a way that, on the one hand, no retroactive forces are transmitted to the drive system by it and, on the other hand, there is less influence of the torque support on the position of the roll bearing.

Accordingly, a torque support for absorbing drive torques of at least one shaft drive is proposed, having two first force-conducting elements which are each fixed to the shaft drive rotatably and at a distance from one another by a first end, and having a support element which is arranged at a distance from the shaft drive and to which the first force-conducting elements are each fixed rotatably and at a distance from one another by a second end opposite the first end, and with two second force-conducting elements, each of which is rotatably fixed to the support element at a distance from one another by a first end and is rotatably fixed to the support element at a distance from one another and is rotatably fixed to a stationary element independent of the shaft drive at a distance from one another by a second end opposite the first end. When intercepting moments, one of the two first force-conducting elements is a compression element and the other is a tension element. The first ends of the first force-conducting elements can, in particular, be arranged opposite one another around the first drive axis. The support element may be formed as a planar element extending substantially in the same fixing plane as the fixing points of the force-conducting elements. The second ends of the first force-conducting elements may be arranged opposite each other, and the first ends of the second force-conducting elements may be arranged opposite each other on the support element. In particular, the fixing points of the force-conducting elements can be arranged on the support element in such a way that they define the corner points of a square. As a result, the corner points in this square can be defined alternately by a first force-conducting element and a second force-conducting element. The independent fixed element can in particular be a machine frame, an attachment point independent of the calender or a further drive. The support element can in particular be arranged centrally below the drives and aligned in the plane of the end faces or parallel to the end faces of the drives.

The advantage of the torque support according to the invention is that the torque is transmitted further to the force transmission elements via two rotatable bearings, via which the force transmission elements are each fixed to the drive or drives, one of which is a tension element and the other a compression element, depending on the direction of torque. Due to the rotatable bearings, it is systematically only possible to transmit torque in the form of a tensile force and a compressive force. Due to this design, it is only possible for the torque support to transmit a torque. No other forces are introduced into the system. Thus, a fluctuation of the drive torque does not lead to any inaccuracy of the system.

In particular, the second ends of the second force-conducting elements can be rotatably fixed to a second shaft drive arranged parallel to the first shaft drive and spaced apart from each other. In this case, the second ends of the second force-conducting elements can in particular be arranged opposite each other around the second drive axis. This can result in a mirror-symmetrical arrangement of the two drives and first and second force-conducting elements, in which the axis of symmetry runs vertically through the support element. Changing the roll spacing is also possible with the torque support according to the invention, since the support element can be moved freely. By changing the roller spacing, the support element would merely move up or down. The angular position of the two rolls remains identical even when the roll position is adjusted.

Furthermore, the force-conducting elements can each be rotatably mounted around their respective fixing points. This means that only tensile and compressive forces are transmitted via the force-conducting elements to the externally arranged support element, which is only supported or connected by the rotatable bearings at the end of the force-conducting elements. The fact that the force-conducting elements are each rotatably mounted around their respective fixing points implies that the force-conducting elements are each rotatable in a plane perpendicular to the axial direction of the associated drive. In particular, the force-conducting elements can be fixed to the respective drive by rotatable screw connections. Alternatively, a bearing can be arranged between the respective drive and the force-conducting element. Alternatively, the force control element can also be fixed to the respective drive by means of an articulated connection.

It can be provided that the first ends of the first force-conducting elements are rotatably fixed opposite each other on a flange surrounding the drive shaft of the first shaft drive. Alternatively, a fastening disk can be mounted on the flange of the first drive as an intermediate element, to which the force-conducting elements are in turn fixed.

It may also be provided that the second ends of the second force-conducting elements are rotatably fixed opposite one another on a flange surrounding the drive shaft of the second shaft drive. Alternatively, a fastening disk can also be mounted on the flange of the second drive as an intermediate element, to which the force-conducting elements are in turn fixed.

The force-conducting elements may each be attached to the drives such that a first line intersecting the first ends of the first force-conducting elements and a second line intersecting the second ends of the second force-conducting elements intersect at an angle of 60°-120°, preferably 80°-100°, and more preferably 90°.

Furthermore, a spacer can additionally be mounted on the flange of the first or the second drive, to which the respective ends of the force-conducting elements are fixed, so that the force-conducting elements fixed to the spacer and the force-conducting elements fixed to the other drive run in different planes perpendicular to the axial direction of the drive shafts. Alternatively, if fixing washers are provided on the flanges, the spacer can be mounted between the respective fixing washer and the respective flange. The fastening washers can be mounted on the respective flange by means of screws. The spacer can either be screwed directly to the flange or have holes aligned with the fastening washers, via which the spacer and the associated fastening washer are screwed together to the flange.

In addition, the front force control elements can be fixed to the front of the support element and the rear force control elements can be fixed to the rear of the support element. This allows the drives to move freely relative to each other or to move the support element up and down without one of the force control elements hindering one of the movements mentioned.

Furthermore, the ends of the force-conducting elements fixed to the support element can be fixed to the support element distributed around a circular circumference or define the corner points of a square.

Furthermore, it can be provided that the first force-conducting elements and the second force-conducting elements are each arranged parallel to one another. This means that the distance between the fixing points of the first ends of the force-conducting elements and the distance between the fixing points of the second force-conducting elements are the same.

Furthermore, one of the first and one of the second force-conducting elements can cross between the fixing points on the drives and the fixing points on the support element. In particular, the first and second force-conducting elements fixed to the side of the support element facing the drives can cross between the respective fixing points on the drives and the respective fixing points on the support element. In contrast, it can be provided that the respective other first and second force-conducting elements do not cross.

In addition, the second ends of the first force-conducting elements and the first ends of the second force-conducting elements can each be fixed to the support element opposite one another and at regular intervals.

In addition, by increasing the distance between the two parallel drive axes of both drives, the support element can be moved in the direction of the drive axes.

Furthermore, the force-conducting elements can be rod-shaped. In particular, they can be designed as flat bars. All force-conducting elements can have the same length. Holes can be provided at the first and second ends of the first and second force-conducting elements, via which the force-conducting elements can be fastened to the respective fixing points. The hole spacing can be the same for all force-conducting elements. The ends of the force-conducting elements can each be rounded.

Furthermore, the support element can be annular. In particular, the circumference of the support element on which the ends of the force-conducting elements are fixed can correspond to the circumference on the flange of the first and/or second drive on which the ends of the force-conducting elements on the other side are fixed. In particular, the support element may have a flat circumferential ring on which holes for fixing the force-conducting elements are arranged at regular intervals. Alternatively, the support element can have the shape of a round or polygonal disc, as long as fixing of the force-conducting elements as described above is ensured.

Furthermore, the invention proposes a roll arrangement with at least two rolls arranged in parallel, in particular counter-rotating, between which a nip is formed in each case, the rolls being driven via counter-rotating shaft drives arranged next to one another, comprising at least one torque support as described above.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
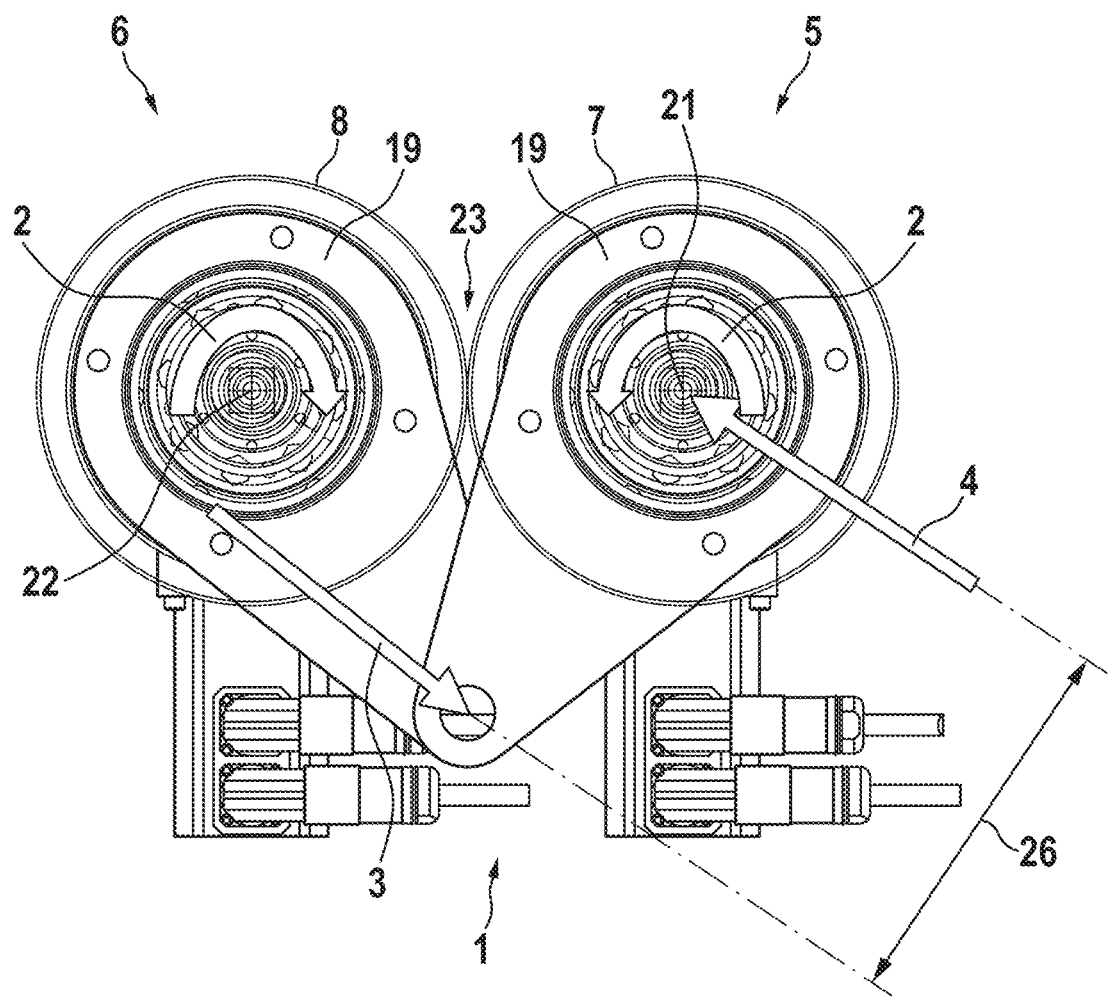
Figure 3:
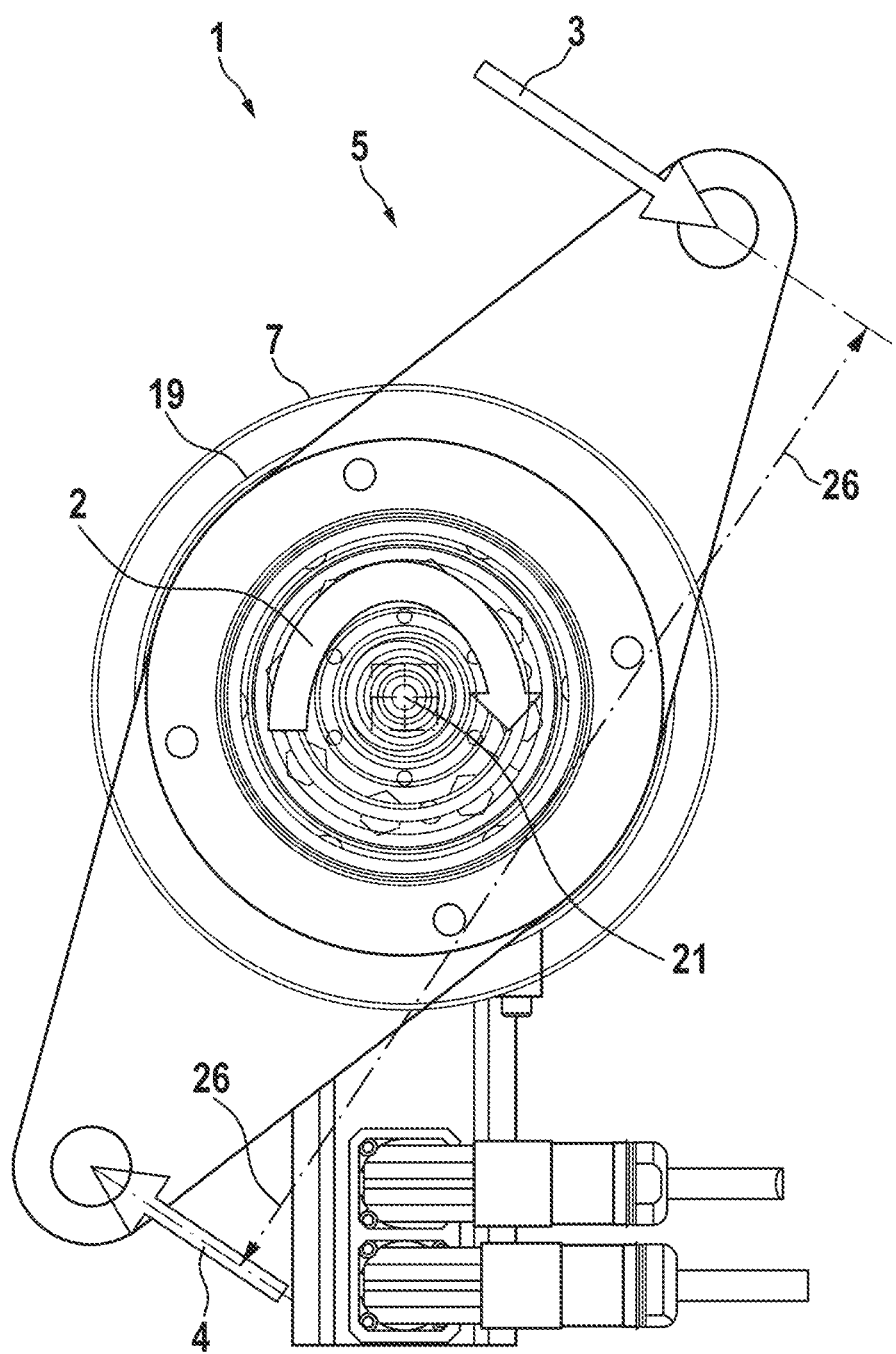
Figure 4:
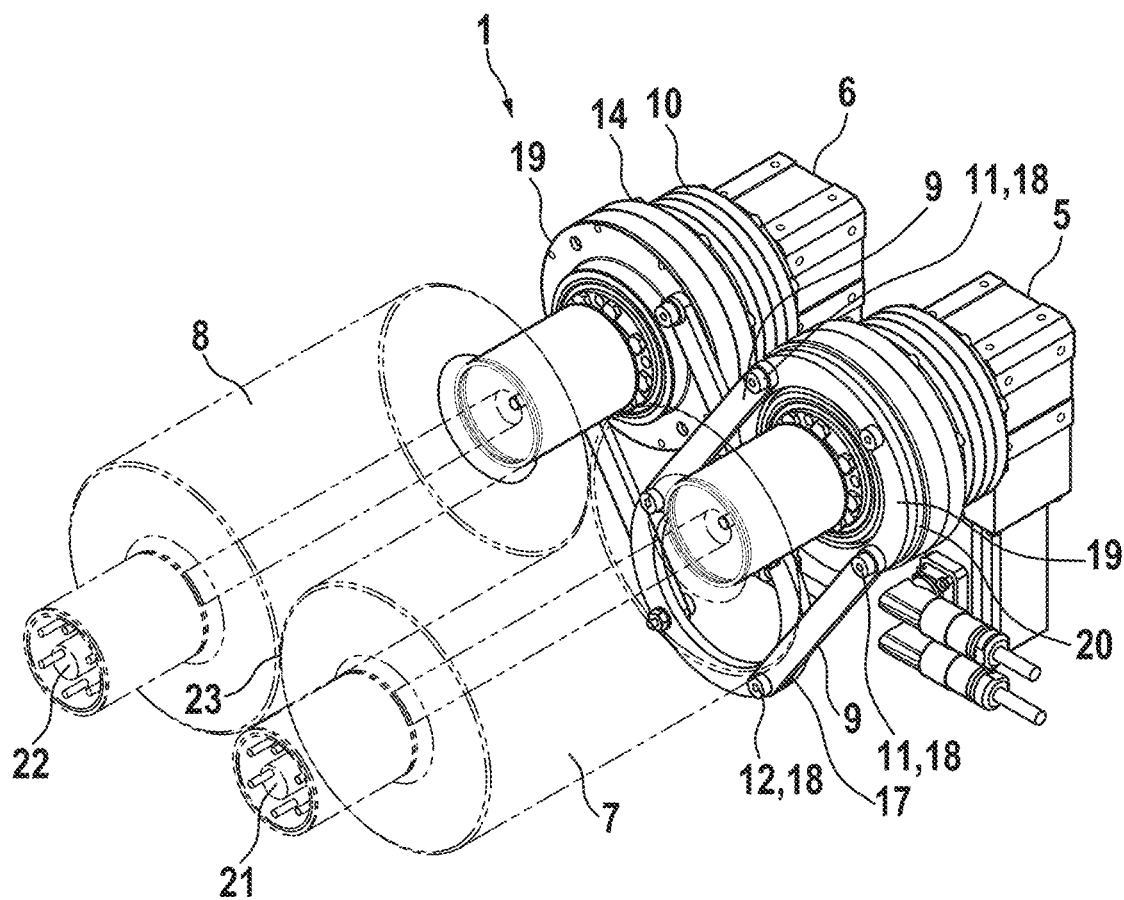
Figure 5:
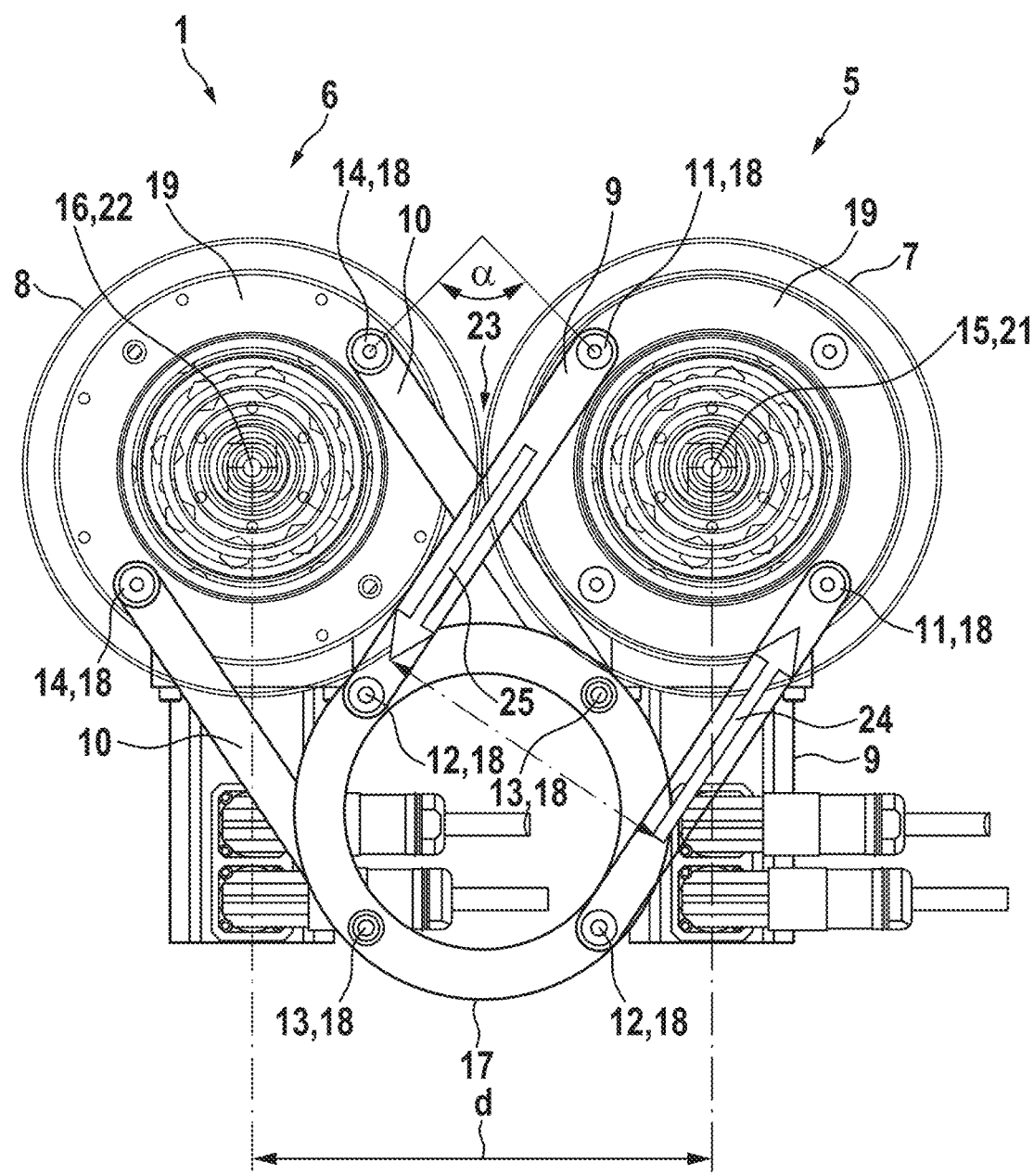
Figure 6:
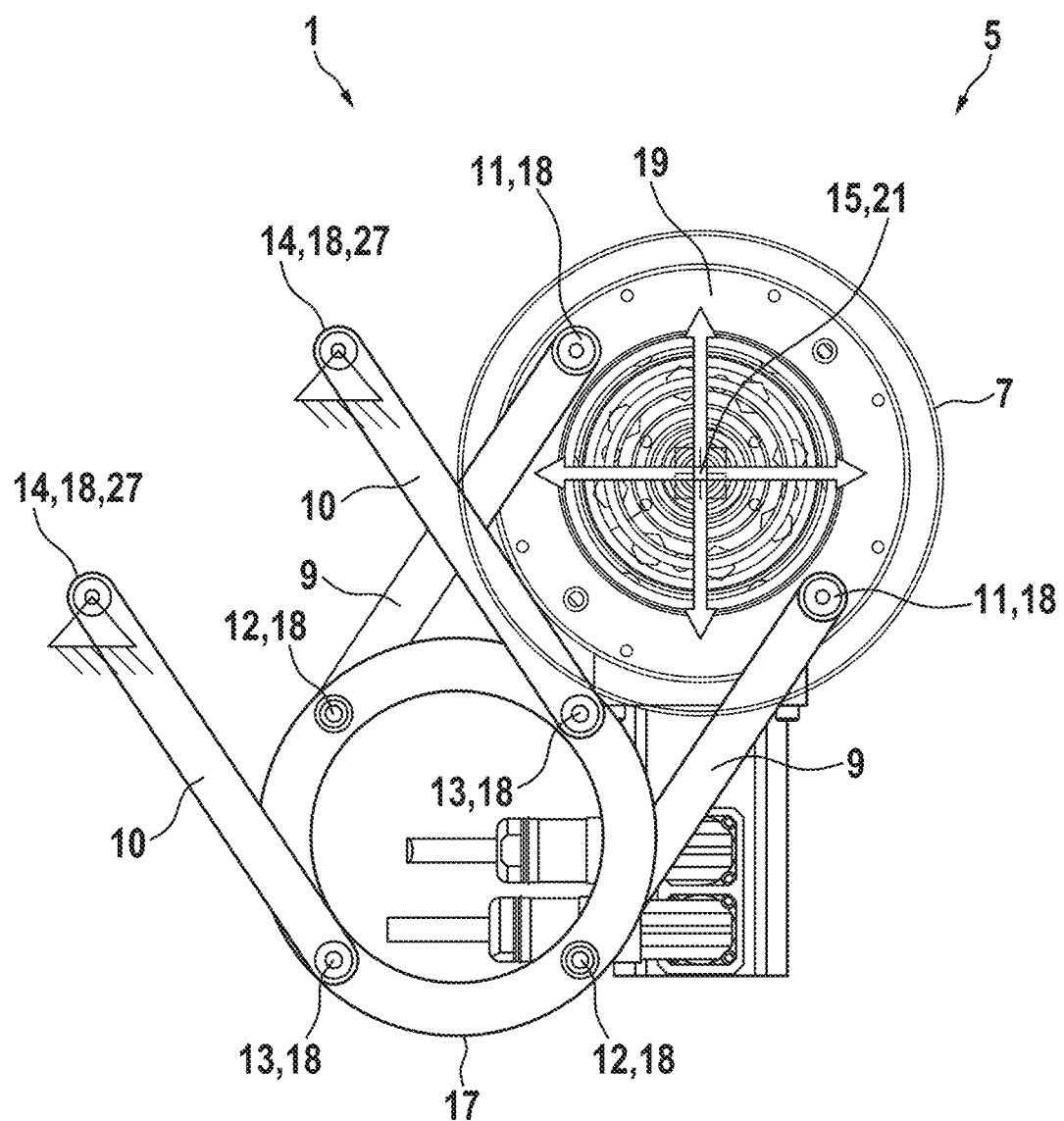
Figure 7:
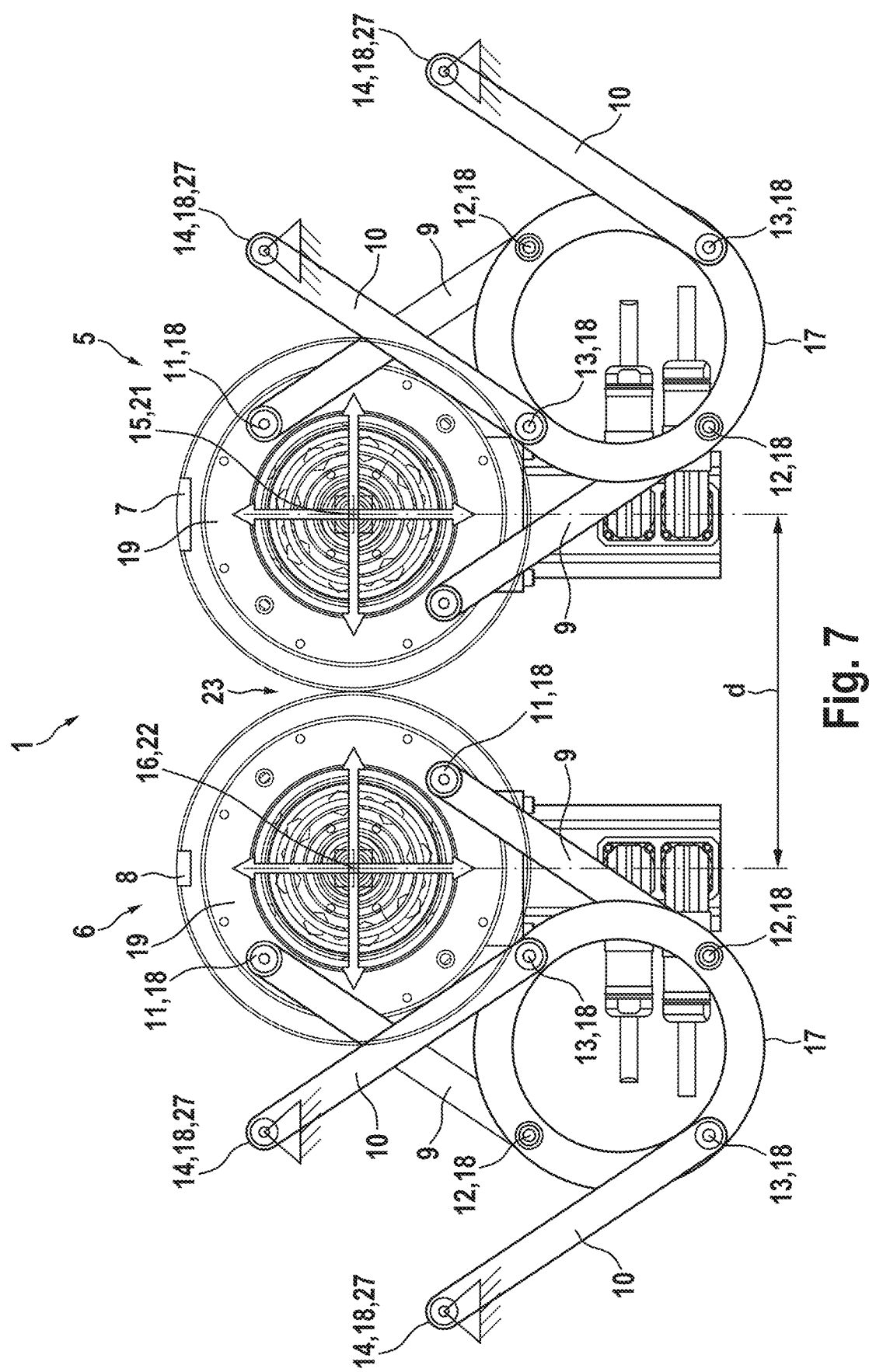
Figure 8:
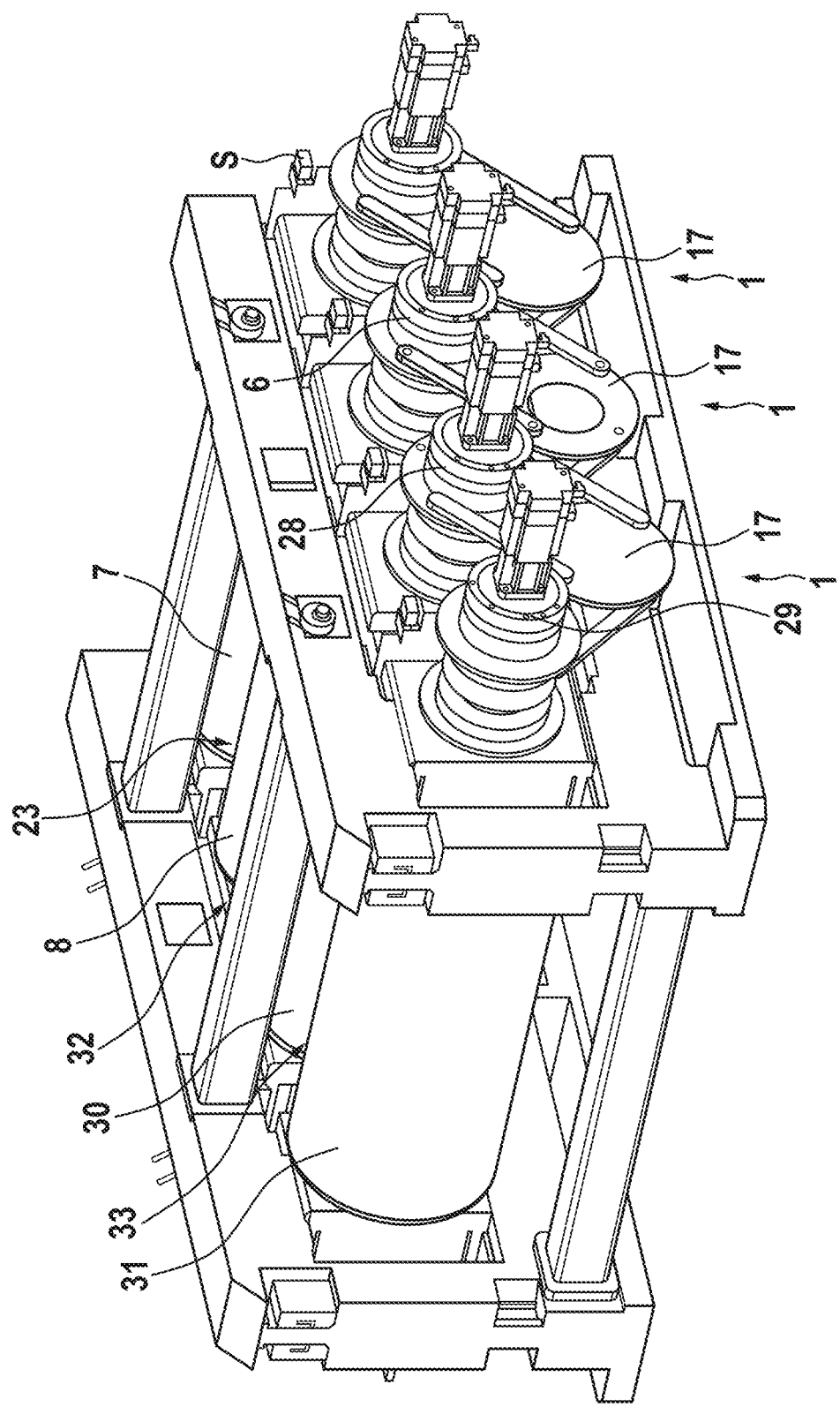
Figure 9:
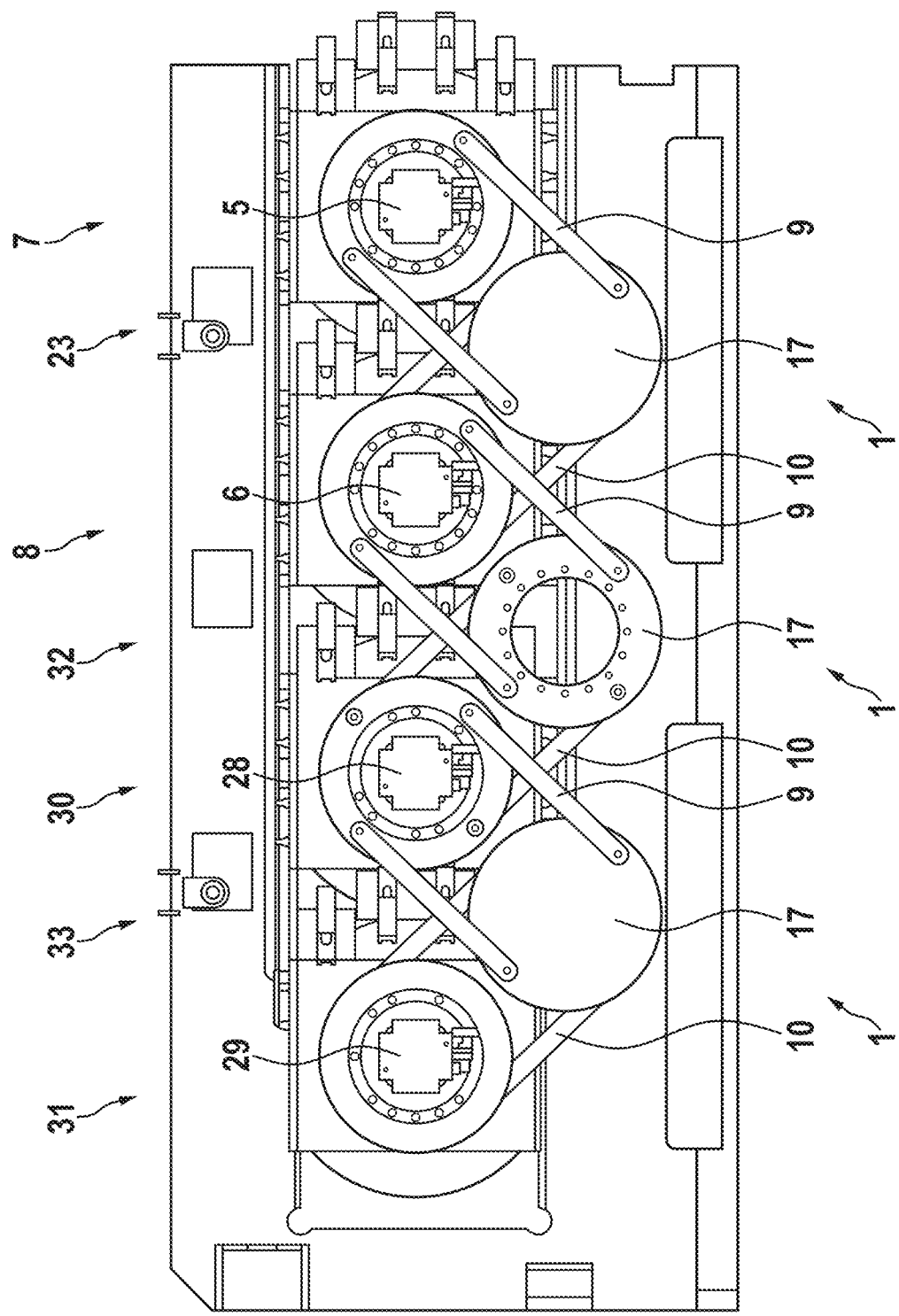

Exemplary embodiments of the invention are explained with reference to the following figures. Thereby shows:

FIG. 1 a perspective view of an embodiment of mutually intercepting torque supports known from the prior art;

FIG. 2 a frontal view of the prior art design of a torque support according to FIG. 1;

FIG. 3 a frontal view of a prior art design of a torque support with a two-sided bearing;

FIG. 4 a frontal view of a first embodiment of the torque support according to the invention;

FIG. 5 a frontal view of a further embodiment of the torque support according to the invention;

FIG. 6 a perspective view of a further embodiment of the torque support according to the invention;

FIG. 7 a frontal view of the embodiment of the torque support according to the invention as shown in FIG. 6;

FIG. 8 a perspective view of a further embodiment of the torque support according to the invention;

FIG. 9 a frontal view of the embodiment of the torque support according to the invention as shown in FIG. 8.

DETAILED DESCRIPTION

Example embodiments will now be described more fully with reference to the accompanying drawings.

FIG. 1 shows a prior art solution of a torque support 1 for absorbing torques, in which the drive torques occurring at calender or rolling mill drives 5, 6 are absorbed by mutually supporting torque supports, which on the one hand are each rigidly fastened to a flange 19 of the drive 5, 6 and on the other hand are rotatably anchored to each other at a common fixing point. The drives 5, 6 are directly connected to the respective rolls 7, 8. The drive axes 21, 22 are aligned parallel to each other so that an equidistant rolling gap 23 is formed between the rolls 7, 8.

As shown in FIG. 2, this one-sided interception of the forces always induces a force in the corresponding bearing. As an example, only the right-hand drive side 5 is explained in FIG. 2. As soon as a torque 2 is generated on the drive side, the torque 2 is intercepted by the torque support 1 of the right drive 5 via the force 3 and the lever arm 26. However, this creates a retroactive force 4 on the drive 5. This force 4 ensures that the roller 7 is forced out of its position and, depending on the magnitude of the drive torque, there can be varying degrees of impact on the accuracy of the system. Since the retroactive force 4 has a component in the same direction of action as the feed direction of the calender, it has a direct influence on the rolling force or the nip 23.

In contrast to the example shown in FIGS. 1 and 2, the embodiment of a torque support 1 shown in FIG. 3 has a two-sided anchorage in which the torque support 1 has two opposing lever arms 26 of the same length. A double-sided torque support 1 ensures that the torque-absorbing force 3 and the reaction force 4 cancel each other out, so that no force acts on the support and the nip 23 is not affected. In this case, however, the drive 5 is fixed in its position by two points in a disadvantageous manner and thus cannot completely compensate for the movements.

The first embodiment of the torque support 1 according to the invention shown in FIG. 4 shows a shaft drive 5 with a first roller 7, in which the torque support is provided by a support element 17, which is connected on the one hand to a flange 19 of the drive via two first force transmission elements 9 and on the other hand to two fixed bearings 27 via two second force transmission elements 10. The fixed bearings 27 can be external elements, i.e. decoupled from the shaft drive 5, such as the machine frame of the machine or other structures suitable as fixed bearings. The first force-conducting elements 9 are rotatably attached by first ends 11 to fixing points 18 on the flange 19 of the first shaft drive 5, where rotatable means in particular in a plane perpendicular to the shaft drive axis 21. The first force-conducting elements are likewise rotatably fastened with second ends 12 at fixing points 18 on the support element 17. The force-conducting elements 9 run parallel to each other. This means that the fixing points 18 on the flange 19 on the one hand and the support element 18 on the other hand are each the same distance apart. The force-conducting elements are designed as flat bars, which are preferably made of metal. The support element 17 is formed annularly from a flat part, which in particular has the same width as the force-conducting elements. The ring diameter corresponds on average in particular to the spacing of the fixing points 18. The first force-conducting elements 9 are arranged opposite one another on the support element 17. The second force-conducting elements 10 are preferably offset by 90° in each case relative to the first force-conducting elements 9 and are fastened rotatably with first ends 13 to fixing points 18 on the support element 17. As a result, the second force-conducting elements 10 are also arranged opposite each other on the support element 17. With second ends 14, the second force-conducting elements 10 are rotatably fastened to fixing points 18, which are designed in particular as fixed bearings 27. The distances between the fixing points 18 of the second force-conducting elements 10 are also the same, so that the second force-conducting elements 10 also run parallel to one another. Such an arrangement ensures that the force-conducting elements each transmit only compressive or tensile stresses, but not torques. Compared with conventional torque supports, this significantly reduces the deflection of the drive from its set position due to large torques.

FIG. 5 shows a further embodiment of the torque support 1 in which two shaft drives 5, 6 or two rolls 7, 8 driven by the shaft drives 5, 6 are arranged parallel to one another and form a common nip 23 between them. As a result, the drive direction of the drives 5, 6 is always opposite to each other. Each of the drives 5, 6 thereby has a separate torque support 1, that is, each drive 5, 6 has separate first and second force-conducting elements 9, 10 and separate support elements 17. The second force-conducting elements 10 are each rotatably secured by their second ends 14 to separate fixed bearings 27. The torque supports 1 have the effect of preventing the deflection of the drives 5, 6 from their nominal positions even at high torques, for example during load changes, so that the distance d between the shaft drive axes and correspondingly the infeed in the nip 23 remain the same.

In a further embodiment of the torque support 1, shown in FIGS. 6 and 7, the two counter-rotating drives 5, 6 have a common torque support 1, so that both drives 5, 6 support each other. The torque 2 is now dissipated via two parallel force-conducting elements 9, 10 fixed to each of the drives 5, 6, which are each fixed with their opposite ends 12, 13 to an annular support element 17. The force-conducting elements 9, 10, which are designed as flat bars, are each rotatably mounted at their fixing points 18. As a result, the force-conducting elements 9, 10 serve only to transmit tensile or compressive forces, but not to transmit a torque to the support element 17. Finally, this means that no retroactive forces act on the drives 5, 6, so that the nip 23 is not affected even at high torques.

For this purpose, two first ends 11 of first force-conducting elements 9 are rotatably fixed at fixing points 18 on a flange 19 of the first drive 5, radially opposite each other, orthogonally to the first drive axis 21. The first force-conducting elements 9 are designed as flat bars and have the same length and are each rotatably fixed to the support element 17 with opposite second ends 12 on the circumference of an annular support element 17 at respective fixing points 18. The first force-conducting elements 9 are thereby rotatable parallel to the plane in which the support element 17 extends. The fixing points 18 on the flange 19 and the fixing points 18 on the support element 17 of the first force-conducting elements 9 each have the same distances, so that the two first force-conducting elements 9 run parallel to one another.

On the flange 19 of the second drive 6, radially opposite each other, two second ends 14 of second force-conducting elements 10 are rotatably fixed at fixing points 18 orthogonally to the second drive axis 22. The second force-conducting elements 10 are also designed as flat bars and have the same length as the first force-conducting elements 9 and are each rotatably fixed to the support element 17 with opposite first ends 13 on the circumference of the annular support element 17 at respective fixing points 18. The second force-conducting elements 10 are thereby rotatable parallel to the plane in which the support element 17 extends. The fixing points 18 on the flange 19 and the fixing points 18 on the support element 17 of the second force-conducting elements 10 also have the same distances in each case, so that the two second force-conducting elements 10 also run parallel to one another. A straight line connecting the fixing points 18 of the first force-conducting elements 9 on the flange 19 of the first drive 5 and a straight line connecting the fixing points 18 of the second force-conducting elements 10 on the flange 19 of the second drive 6 intersect at an angle α above the roller arrangement. By adjusting the angle, the vertical distance of the support element 17 from the parallel drive axes 21, 22 of the roller arrangement can be set. The annular support element 17 is formed from a flat ring, over the circumference of which are arranged alternating fixing points 18 of the first and second force-conducting elements 9, 10, the first force-conducting elements 9 being fixed at the front and the second force-conducting elements 10 being fixed at the rear of the support element 17, so that the force-conducting elements 9, 10 do not interfere with one another. For example, the upper first force-conducting element 9 and the upper second force-conducting element 10 cross each other on their routes between the respective fixing points 18 on the respective flange 19 and on the support element 17, the first force-conducting element 9 running in front of the second force-conducting element 10 and the two not interfering with each other in the respective range of movement. Accompanying this, a spacer 20 in the form of a flat washer is provided on the flange 19 of the first drive 5, which is mounted below the fastening element to which the first force-conducting elements 9 are fixed on the first drive 5. The spacer 20 has approximately the sum of the thicknesses of the second force-conducting elements 10 and the support element 17 in order to compensate for the resulting difference in thickness.

It is also possible to change the distance d between the drive axles 21, 22 and the nip 23, respectively, since the support element 17 can be moved up and down by the rotatable bearing of the force guide elements 9, 10. The angular position of the two rolls 7, 8 can be maintained even when the roll spacing is adjusted.

FIGS. 8 and 9 show a further embodiment of the invention in which four rolls 7, 8, 30, 31 are arranged parallel to each other to form three nips 23, 32, 33. Adjacent rolls are in each case counter-rotating. In particular, in the arrangement shown, three torque supports 1 with three support elements 17 are provided, each of which is arranged below between two rolls. In this embodiment, two adjacent torque supports 1 are assigned to each of the two inner shaft drives 6, 28. As a result, four force-conducting elements 9, 10 are rotatably attached to the flanges 19 of the drives 6, 28 in each case, with two first force-conducting elements 9 being attached to a support element 17 arranged below on the left and two second force-conducting elements 10 being attached to a support element 17 arranged below on the right. In the embodiment shown, the first force-conducting elements 9 each run in a plane at the front of the support elements 17 and the second force-conducting elements 10 run in a plane at the rear of the support elements 17. Corresponding spacers 20 are installed on the drives 5, 6, 28, 29 for this purpose, by means of which different fastening planes are provided for the first and second force-conducting elements 9, 10. It goes without saying that the principle of the embodiment shown can alternatively be applied to any number of shaft drives arranged next to each other.

The features of the invention disclosed in the foregoing description, in the figures as well as in the claims may be essential for the realization of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A torque support for absorbing drive torques of at least a first-shaft drive, comprising: two first force-conducting elements, each of which is rotatably fixed to a first end of the first shaft drive at a distance from one another
a support element arranged at a distance from the first shaft drive, the first force-conducting elements are each fixed rotatably to the support element and at a distance from one another by a second end opposite the first,
a fixed element independent of the first shaft drive and
two second force-conducting elements, which are each fixed at a distance from one another by a first end to the support element and are each fixed at a distance from one another by a second end, which is opposite the first end, to the fixed element which is independent of the first shaft drive, wherein the two second force conducting elements are each rotatably fixed with the first end to the support element and are each rotatably fixed with the second end to the fixed element independent of the first shaft drive.

2. The torque support according to claim 1 further comprising a second counter-rotating shaft drive arranged parallel to the first shaft drive, wherein the second ends of the second force-conducting elements are rotatably fixed to the second shaft drive and at a distance from one another.

3. The torque support according to claim 2, with a second flange surrounding the drive shaft of the second shaft drive, wherein the second ends of the two second force-conducting elements are rotatably fixed opposite to the second flange.

4. The torque support according to claim 2, wherein a spacer is additionally mounted on the flange of the first or of the second drive, on which the respective ends of the force-conducting elements are fixed, so that the force-conducting elements fixed to the spacer and the force-conducting elements fixed to the drive that the spacer is not mounted on run in planes which differ perpendicularly to an axial direction of the drive shafts.

5. The torque support according to claim 4, wherein the front force-conducting elements are fixed to the front side and the rear force-conducting elements are fixed to the rear side of the support element.

6. The torque support according to claim 2, wherein one of the first and one of the second force-conducting elements cross between the fixing points on the first shaft drive and the second shaft drive and the fixing points on the support element.

7. The torque support according to claim 2, wherein the second ends of the first force-conducting elements and the first ends of the second force-conducting elements are respectively fixed opposite each other and at regular intervals on the support element.

8. The torque support according to claim 1, wherein the first force-conducting elements and the second force-conducting elements are each rotatably mounted around their respective fixing points.

9. The torque support according to claim 1, with a first flange surrounding the drive shaft of the first shaft drive, wherein the first ends of the two first force-conducting elements are rotatably fixed opposite each other to the first flange.

10. The torque support according to claim 1, wherein the the second ends of the first force-conducting elements and the first ends of the second force-conducting elements fixed to the support element are fixed to the support element distributed on a circular circumference.

11. The torque support according to claim 1, wherein the first force-conducting elements and the second force-conducting elements are arranged parallel to one another.

12. The torque support according to claim 1, wherein the first force-conducting elements and the second force-conducting elements are rod-shaped.

13. The torque support according to claim 1, wherein the support element is annular.

14. A roller arrangement with at least two parallel, counter-rotating, rollers, between each of which a nip is formed, wherein the rollers are driven via counter-rotating shaft drives arranged next to one another, having at least one torque support according to claim 1.

* * * * *